(12) United States Patent
Tanaka

(10) Patent No.: US 8,085,326 B2
(45) Date of Patent: Dec. 27, 2011

(54) SOLID IMAGING DEVICE AND DRIVING METHOD THEREOF

(75) Inventor: Nagataka Tanaka, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 621 days.

(21) Appl. No.: 11/553,262

(22) Filed: Oct. 26, 2006

(65) Prior Publication Data

US 2007/0103574 A1    May 10, 2007

(30) Foreign Application Priority Data

Oct. 28, 2005  (JP) ................................ 2005-314712
Oct. 28, 2005  (JP) ................................ 2005-314713

(51) Int. Cl.
*H04N 5/208* (2006.01)
*H04N 5/335* (2011.01)
*H04N 3/14* (2006.01)

(52) U.S. Cl. ...................................... 348/308; 348/294

(58) Field of Classification Search .......... 348/273–275, 348/300–302
See application file for complete search history.

(56) References Cited

U.S. PATENT DOCUMENTS

| | | | |
|---|---|---|---|
| 6,801,256 B1 * | 10/2004 | Egawa et al. ................. | 348/294 |
| 6,946,636 B2 | 9/2005 | Eguchi et al. | |
| 2001/0013901 A1 * | 8/2001 | Matsunaga et al. ........... | 348/308 |
| 2001/0052941 A1 * | 12/2001 | Matsunaga et al. ........... | 348/308 |
| 2003/0179159 A1 * | 9/2003 | Ohsawa et al. ................ | 345/55 |
| 2003/0206234 A1 * | 11/2003 | Sakurai et al. ................ | 348/301 |
| 2004/0173864 A1 * | 9/2004 | Inagaki et al. ................ | 257/443 |
| 2005/0062867 A1 * | 3/2005 | Mabuchi ........................ | 348/308 |
| 2005/0206764 A1 * | 9/2005 | Kobayashi et al. ........... | 348/308 |
| 2005/0248674 A1 * | 11/2005 | Mabuchi et al. .............. | 348/308 |

FOREIGN PATENT DOCUMENTS

| | | |
|---|---|---|
| CN | 1674296 A | 9/2005 |
| JP | 5-207375 | 8/1993 |
| JP | 10-093066 | 4/1998 |
| JP | 11-274451 | 10/1999 |
| JP | 2004-172950 | 6/2004 |
| JP | 2005-192191 | 7/2005 |
| JP | 2005-217607 | 8/2005 |
| JP | 2005-277279 | 10/2005 |
| JP | 2007-104186 | 4/2007 |
| WO | WO 03/085964 | 10/2003 |

OTHER PUBLICATIONS

Keiji Mabuchi, et al., "CMOS Image Sensor Using a Floating Diffusion Driving Buried Photodiode", ISSCC Digest of Technical Papers, Feb. 2004.
U.S. Appl. No. 12/827,190, filed Jun. 30, 2010, Taruki, et al.
Japanese Office Action issued on Jan. 4, 2011, in corresponding Patent Application No. 2005-314713 (with English Translation).
Office Action issued Nov. 16, 2010, in Japanese Patent Application No. 2005-314712 (w/English-language Translation).
U.S. Appl. No. 13/052,182, filed Mar. 21, 2011, Taruki, et al.

* cited by examiner

*Primary Examiner* — David Ometz
*Assistant Examiner* — Dwight C Tejano
(74) *Attorney, Agent, or Firm* — Oblon, Spivak, McClelland, Maier & Neustadt, L.L.P.

(57) ABSTRACT

A solid imaging device includes a vertical signal line, a unit pixel including a photodiode which photoelectrically converts and stores incident light, an amplifying transistor which amplifies an input signal from the photodiode and outputs the amplified signal to the vertical signal line, and a reset transistor which resets a potential of a control electrode of the amplifying transistor, and a control circuit configured to maintain a state of a potential of the vertical signal line while the reset transistor is being driven.

12 Claims, 7 Drawing Sheets

SOLID IMAGING DEVICE AND DRIVING METHOD THEREOF

CROSS-REFERENCE TO RELATED APPLICATIONS

This application is based upon and claims the benefit of priority from prior Japanese Patent Applications No. 2005-314712, filed Oct. 28, 2005; and No. 2005-314713, filed Oct. 28, 2005, the entire contents of both of which are incorporated herein by reference.

BACKGROUND OF THE INVENTION

1. Field of the Invention

The present invention relates to a solid imaging device and a method of driving the solid imaging device, and is applied, for example, to a CMOS image sensor.

2. Description of the Related Art

Conventionally, a CMOS image sensor is known as an example of a solid imaging device. Such a CMOS image sensor is disclosed in Mabuchi, et al., "CMOS Image Sensor Using a Floating Diffusion Driving Buried Photodiode", ISSCC Digest of Technical Papers, February 2004 (Non-Patent Document 1).

In the solid imaging device disclosed in Non-Patent Document 1, however, since an amplifying transistor operates in an inter-pentapolar region at the time of a booting operation, only ⅔ of the gate capacitance of the amplifier transistor can contribute to the boosting operation.

In addition, in the driving operation of the solid imaging device disclosed in Non-Patent Document 1, in order to select a desired unit pixel, a period in which a drain power supply DRN is decreased to a low level (i.e. a Low-state period) is needed. The drain power supply DRN in the unit pixel also functions to absorb an excess signal charge. In the case where there is a period (Low-state period) in which a high voltage is not applied to the drain power supply DRN, if a high-luminance subject is imaged, an excess charge that overflows from a photodiode cannot be absorbed by the drain power supply DRN, leading to occurrence of blooming.

BRIEF SUMMARY OF THE INVENTION

According to an aspect of the present invention, there is provided a solid imaging device comprising: a vertical signal line; a unit pixel including a photodiode which photoelectrically converts and stores incident light, an amplifying transistor which amplifies an input signal from the photodiode and outputs the amplified signal to the vertical signal line, and a reset transistor which resets a potential of a control electrode of the amplifying transistor; and a control circuit configured to maintain a state of a potential of the vertical signal line while the reset transistor is turned on.

According to another aspect of the present invention, there is provided a solid imaging device comprising: a vertical signal line; a plurality of unit pixels, each unit pixel including a photodiode which photoelectrically converts and stores incident light, an amplifying transistor which has a control electrode capacitive-coupled to the vertical signal line, amplifies an input signal from the photodiode and outputs the amplified signal to the vertical signal line, and a reset transistor which resets a potential of the control electrode of the amplifying transistor; and a drain power supply which is connected to one end of a current path of the amplifying transistor and to one end of a current path of the reset transistor, and has a fixed voltage value.

According to still another aspect of the present invention, there is provided a driving method of a solid imaging device comprising a vertical signal line; a plurality of unit pixels, each unit pixel including a photodiode which photoelectrically converts and stores incident light, an amplifying transistor which amplifies an input signal from the photodiode and outputs the amplified signal to the vertical signal line, and a reset transistor which resets a potential of a control electrode of the amplifying transistor; a drain power supply which is connected to one end of a current path of the amplifying transistor and to one end of a current path of the reset transistor and has a fixed voltage value; and a control circuit configured to control a state of a potential of the vertical signal line, wherein when a non-select reset transistor is turned on and a selected reset transistor is turned off, the state of the potential of the vertical signal line is varied by the control circuit, and the amplifying transistor is turned on by making use of a gate capacitance of the amplifying transistor, thereby selecting the unit pixel.

DETAILED DESCRIPTION OF THE INVENTION

First Embodiment

Figure 1:
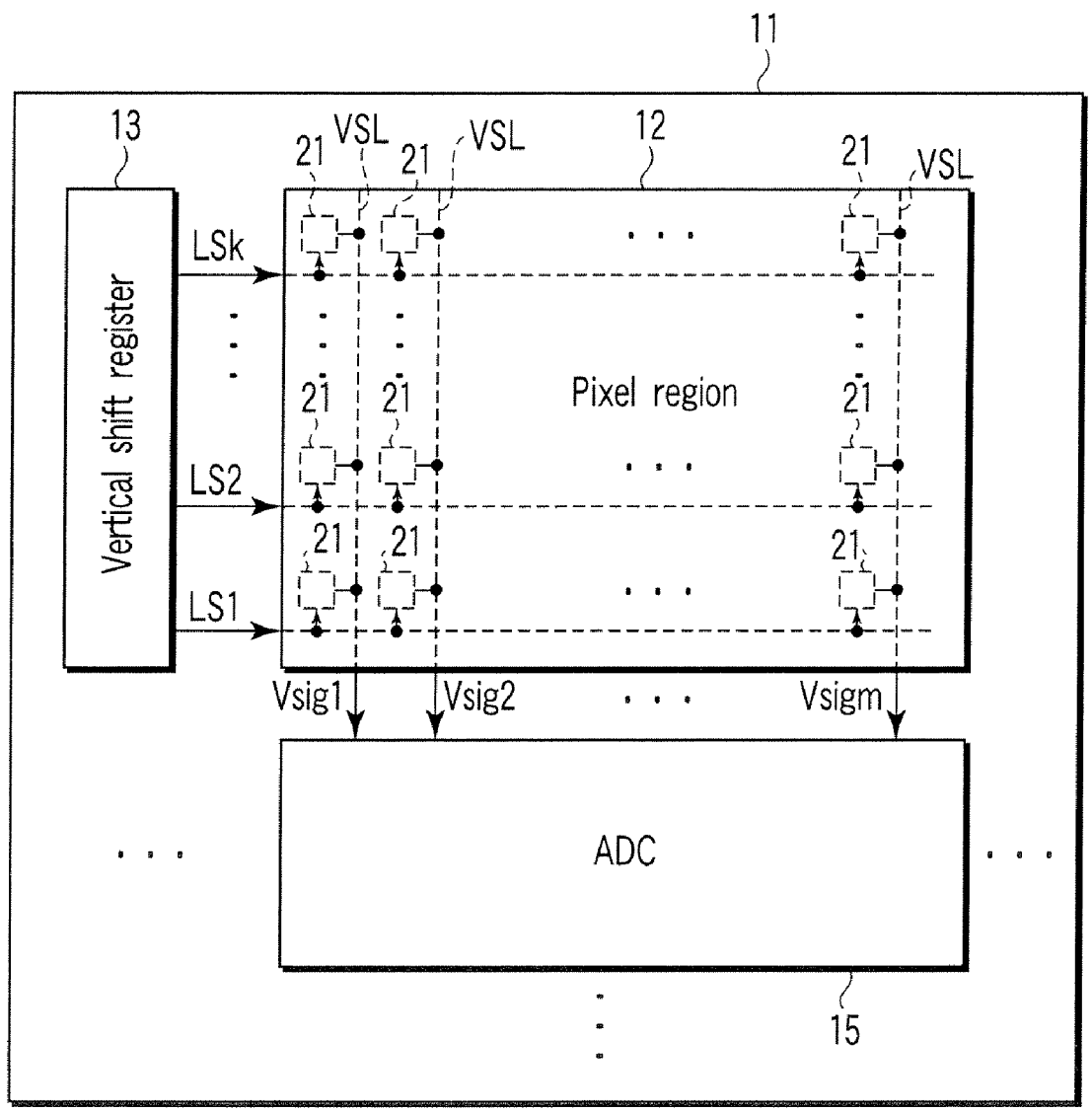
FIG. 1 is a plan view showing a solid imaging device according to an embodiment of the present invention.

A solid imaging device according to a first embodiment of the invention and a method of driving the solid imaging device will now be described with reference to FIG. 1 to FIG. 4. In the description below, common parts are denoted by like reference numerals throughout the drawings. FIG. 1 is a plan view that schematically shows an example of the solid imaging device according to the embodiment.

As is shown in FIG. 1, a pixel region 12, a vertical shift register 13 and an AD conversion circuit 15 are disposed in a semiconductor chip 11.

Unit pixels 21, each including a photodiode that photoelectrically converts and stores incident light, are arrayed in the pixel region 12. The pixel region 12 functions as an image-capturing unit.

The vertical shift register 13 functions as a selection unit which outputs signals LS1 to LSk to the pixel region 12 and selects unit pixels 21 on a reset signal line by reset signal line basis. Analog signals Vsig, which correspond to amounts of incident light, are output via vertical signal lines VSL from the unit pixels 21 which are associated with the selected reset signal line.

The AD conversion circuit 15 functions to convert the input analog signals Vsig from the vertical signal lines VSL to digital signals.

Figure 2:
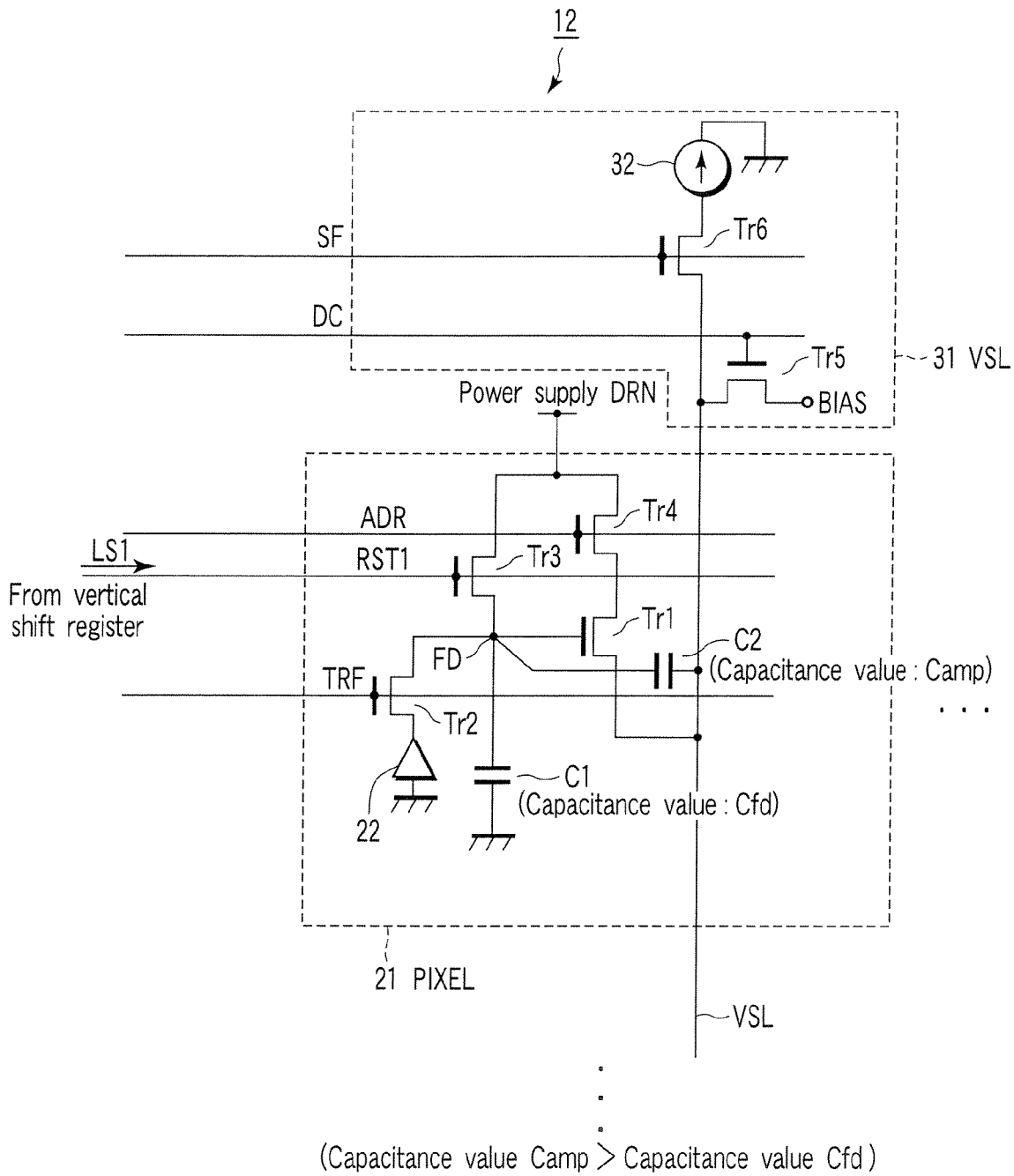
FIG. 2 is a circuit diagram showing one unit pixel in FIG. 1.

Next, referring to FIG. 2, the unit pixels in the pixel region 12 are described. In the description below, one selected unit pixel, to which the signal LS1 is input, is taken as an example.

As shown in FIG. 2, the unit pixel 21 is provided. The unit pixel 21 includes a photodiode 22, an amplifier transistor Tr1, a read-out transistor Tr2, a reset transistor Tr3, and an address transistor Tr4.

The photodiode 22 has a cathode grounded. The amplifier transistor Tr1 is configured to amplify and output a signal from a floating diffusion FD. The amplifier transistor Tr1 has a gate connected to the floating diffusion FD, a source connected to the vertical signal line VSL, and a drain connected to the source of the address transistor Tr4.

The read-out transistor Tr2 is configured to control storage of the photodiode 22. The read-out transistor Tr2 has a gate connected to the read-out signal line TRF, a source connected to the anode of the photodiode 22, and a drain connected to the floating diffusion FD.

The reset transistor Tr3 is configured to reset the gate potential of the amplifying transistor Tr1. The reset transistor Tr3 has a gate connected to the reset signal line RST, a source connected to the floating diffusion FD, and a drain connected to a drain power supply DRN.

The address transistor Tr4 has a gate connected to the address signal line ADR, and a drain connected to the drain power supply DRN.

A capacitance value of a capacitance C1 relative to ground of the floating diffusion FD is denoted by Cfd, and a capacitance value of a gate capacitance C2 between the floating diffusion FD and the vertical signal line VSL is denoted by Camp.

Further, a VSL control circuit 31, which is configured to control a voltage of the vertical signal line VSL, is provided. The VSL control circuit 31 includes a control signal line DC, a bias transistor Tr5, a selection signal line SF, a load transistor Tr6, and a current source 32.

The bias transistor Tr5 is configured to fix the potential of the vertical signal line VSL at a BIAS level. The bias transistor Tr5 has a gate connected to the control signal line DC, a source connected to a power supply BIAS, and a drain connected to the vertical signal line VSL.

The selection signal line SF is connected to the gate of the load transistor Tr6. The source of the load transistor Tr6 is connected to the drain of the transistor Tr5, and the drain of the load transistor Tr6 is connected to one end of the current source 32. The other end of the current source 32 is grounded.

<Driving Method>

Figure 3:
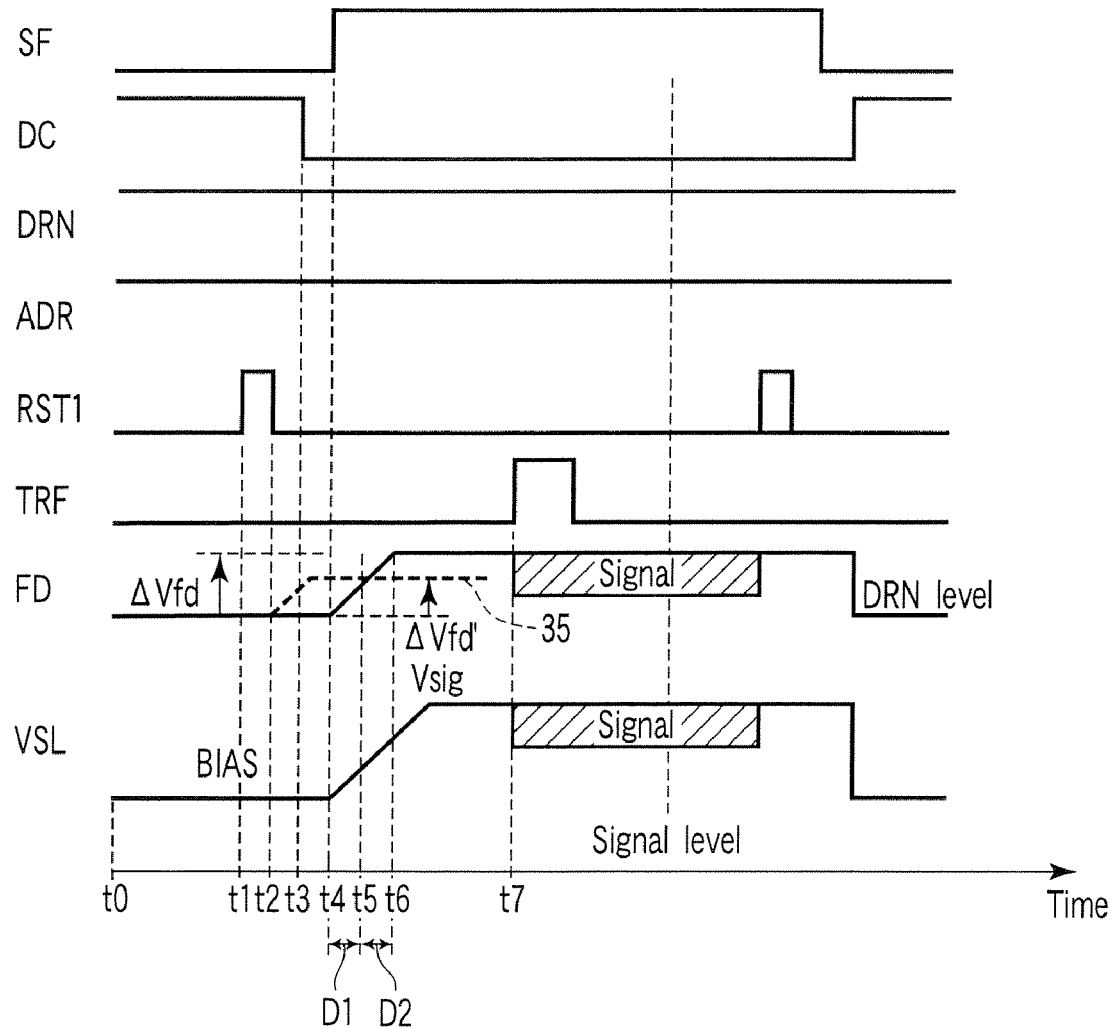
FIG. 3 is a timing chart showing a driving operation of the unit pixel shown in FIG. 2.
Figure 4:
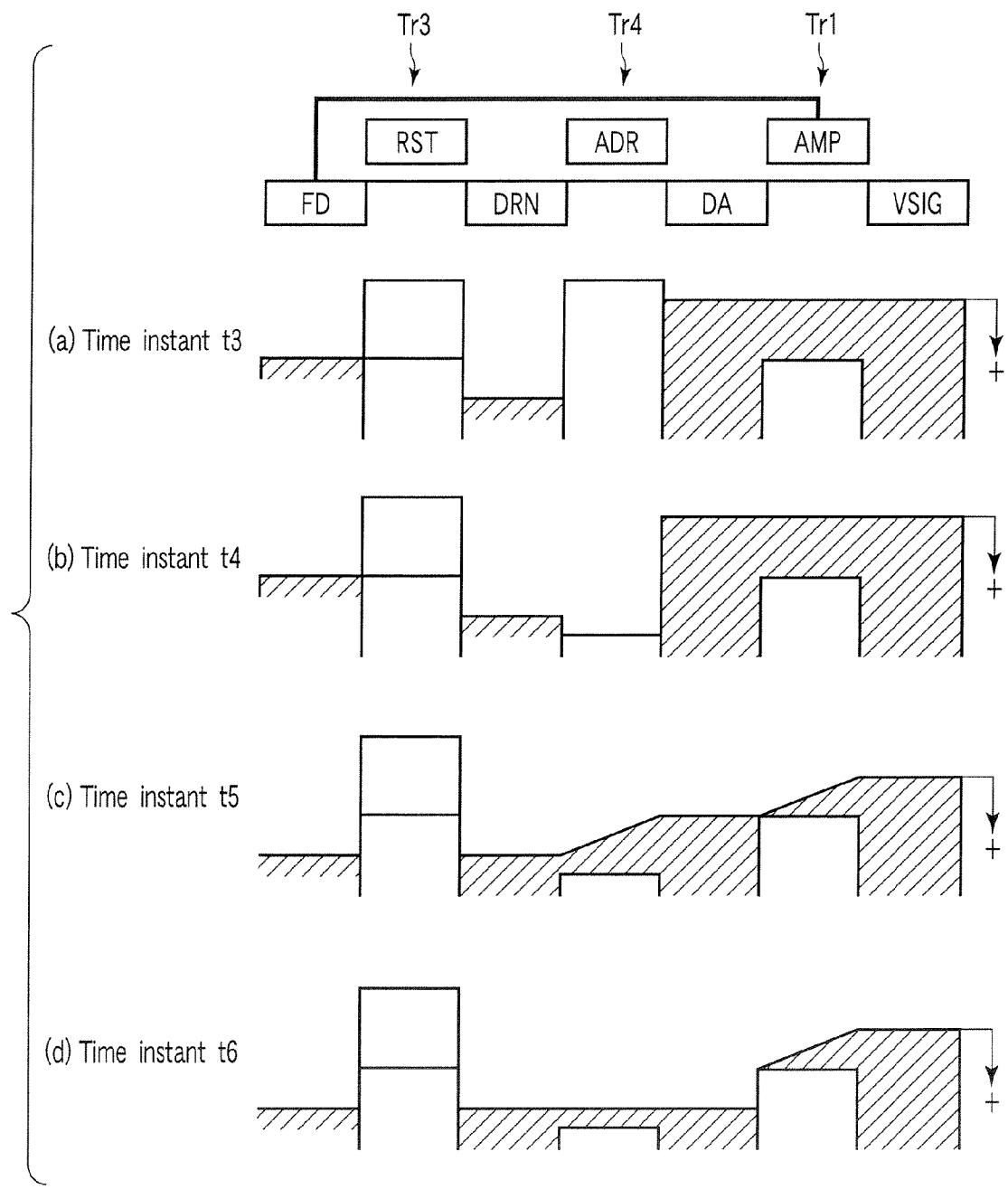
FIG. 4 shows potential diagrams of the unit pixel shown in FIG. 2, part (a) of FIG. 4 being a potential diagram at a time instant t3, part (b) of FIG. 4 being a potential diagram at a time instant t4, part (c) of FIG. 4 being a potential diagram at a time instant t5, and part (d) of FIG. 4 being a potential diagram at a time instant t6.

Next, a driving method of the solid imaging device according to this embodiment is described with reference to FIG. 3 and FIG. 4. FIG. 3 is a timing chart showing an operation of the solid imaging device according to the embodiment. FIG. 4 shows potential diagrams in an operation of the solid imaging device according to the embodiment.

In an initial state at time instant t0, the control signal line DC is selected and set at High state, and the bias transistor Tr5 is turned on. Thus, a relatively low voltage from the power supply BIAS is applied to the vertical signal line VSL. At time instant t0, the reset transistor Tr3 and address transistor Tr4 are turned off.

At time instant t1, the reset signal line RST1 is selected and the reset transistor Tr3 is turned on. A current path between the power supply DRN and the floating diffusion FD is rendered conductive, and the potential of the floating diffusion FD is reset at a level that is nearly equal to the drain voltage. Since the gate voltage of the amplifying transistor Tr1 is equal to the voltage at the floating diffusion FD, the amplifier transistor Tr1 is turned on and the potential at the source and drain terminals of the amplifying transistor Tr1 becomes substantially equal to the value of the voltage of the power supply BIAS.

At time t2, the reset signal line RST is set at Low state, and the reset transistor Tr3 is turned off. The potential of the floating diffusion FD is set in a floating state.

At time t3, the control signal line DC is set at Low state, and the bias transistor Tr5 is turned off (FIG. 4 (a)).

At time t4, a voltage that is higher than the threshold of the transistor by, e.g. 0.3V is applied to the selection signal line SF, and the load transistor Tr6 is made to function as a constant current circuit. At substantially the same time instant, the address signal line ADR is selected, and the address transistor Tr4 is turned on. At this time, a potential Vsig of the vertical signal line VSL, which is determined by a source follower that is constituted by the amplifying transistor Tr1 and load transistor Tr6, is set to be higher than the potential of the power supply BIAS. Then, at time instant t4, since the source/drain voltage of the amplifying transistor Tr1 is substantially equal to the voltage of the power supply BIAS and is lower than Vsig that is in the constant state, the source/drain voltage of the amplifying transistor Tr1 rises toward Vsig. As shown in part (b) of FIG. 4, the amplifying transistor Tr1 operates in an inter-tripolar region (i.e. the drain voltage is lower than the channel potential).

At time t5, since the floating diffusion FD is capacitive-coupled to the channel of the amplifying transistor Tr1 via the capacitance Camp, the floating diffusion FD of the selected pixel 21 on the reset signal line RS1, as shown in part (c) of FIG. 4, rises by a potential ΔVfd, shown below, due to the capacitive coupling. The potential ΔVfd is expressed as follows:

$$\Delta V_{fd} = \frac{C_{amp}}{C_{amp} + C_{fd}}(V sig - \text{BIAS})$$

By properly setting the parameters in the above equation, a higher voltage than the drain voltage can be obtained.

In addition, in the above equation, a coefficient "⅔" is not added before Camp. During the reset period (time instant t1 to time instant t2), the potential of the vertical signal line VSL is maintained at the voltage of the power supply BIAS, which is lower than the voltage Vsig. Between time instant t4 and time instant t5, the amplifying transistor Tr1 is driven so that the potential of the drain thereof becomes lower than the channel potential. Thus, the amplifying transistor Tr1 can be operated in an inter-tripolar region (linear region) D1. Hence, the potential of the floating diffusion FD can be boosted about 1.5 times, compared to an increase in potential ΔVfd' in the prior art indicated by a broken line 35. The reason is that the transistor, as indicated by the broken line 35, was operated in an inter-pentapolar region (saturated region) D2.

Subsequently, between time instant t5 and time instant t6, since the amplifying transistor Tr1 operates in the inter-pentapolar region, the variation in voltage of the floating diffusion FD is relatively small, and the potential of the vertical signal line VSL is substantially equal to that at time instant t4 and the variation in potential is small. The voltage Vsig, which is determined by the potential of the floating diffusion FD of the selected line, is output to the vertical signal line VSL.

At time t7, when the output of the vertical signal line VSL becomes a reset level of the pixel 21, the read-out signal line TRF is set at High state, and the read-out transistor Tr2 is turned on. The output of the vertical signal line VSL in the state in which a signal of the photodiode 22 is output becomes the output signal level of the unit pixel 21, and an output signal is transmitted (Signal level).

Subsequently, the control signal line DC is set in High state, the bias transistor Tr5 is turned on, and the operation returns to the initial state.

In the present embodiment, the potential variation in the floating diffusion FD is determined by the following formula:

$$\frac{C_{amp}}{C_{amp}+C_{fd}}(Vsig-BIAS)$$

Hence, it is desirable to set Camp to be higher than Cfd, if possible, to set Camp>Cfd, and to set (Vsig−BIAS) at a relatively large value.

According to the solid imaging device of the above-described embodiment and the driving method thereof, the following advantageous effects (1) to (3) can be obtained.

(1) The amount of electrons, which can be stored in the floating diffusion FD can be increased.

The pixel size of the unit pixel of the CMOS image sensor has steadily been reduced. If the pixel size is reduced without taking any special measure, the area occupied by the gate electrode of the amplifying transistor also decreases, and as a result the capacitance of the floating diffusion of the pixel decreases. The reason is that a charge amount Q that can be stored in the floating diffusion is expressed by Q=CVfd (C: the gate capacitance, Vfd: the potential of the floating diffusion). If the voltage Vfd is constant, the charge amount Q that can be treated decreases, relative to the capacitance C.

In the example of the above-described Non-Patent Document 1, the charge amount that can be treated is increased by increasing (boosting) the voltage of the floating diffusion higher than the drain voltage.

In Non-Patent Document 1, FIG. 4(b) is a potential diagram at a time immediately after the gate of the reset transistor RST is set at High level and the reset transistor RST is turned on. Since the reset transistor RST is turned on, the potential of the floating diffusion FD is substantially equal to the channel potential of the reset transistor RST.

On the other hand, the potential of the vertical signal line SIG increases, reflecting the potential of the floating diffusion FD. The time of the boost of potential is determined by the capacitance of the vertical signal line relative to ground, and the current supply performance of the load transistor. Thus, a relatively long time is needed in order to bring the potential to a constant state. At the time instant in FIG. 4(b), the constant state is not reached, and the potential is slightly higher than in FIG. 4(a).

FIG. 4(c) shows a potential diagram at a time when the potential of the vertical signal line SIG has reached the constant state after the reset transistor RST was turned on. The floating diffusion FD in the Figure transitions to the floating state after the potential becomes substantially equal to the channel potential of the resent transistor. Thus, if the potential of the vertical signal line SIG varies, the potential becomes higher via the gate capacitance of the amplifier transistor AMP and the potential finally becomes higher that the drain voltage DRN As is known, the potential variation of the floating diffusion FD at the time when the potential state changes from FIG. 4(b) to FIG. 4(c) is expressed by the following equation:

$$\Delta V_{fd} = \frac{\frac{2}{3}C_{amp}}{\frac{2}{3}C_{amp}+C_{fd}}\Delta Vsig$$

In this equation, ΔVsig is the variation amount in potential of the vertical signal line SIG at the time when the potential state changes from FIG. 4(b) to FIG. 4(c), and Camp is the gate capacitance of the amplifying transistor AMP.

The reason why a coefficient "⅔" is added before Camp is that a potential difference occurs between the drain (DRN) and source (SIG) of the amplifying transistor AMP at the time shown in FIG. 4(b), and the amplifying transistor AMP operates in an inter-pentapolar region (saturated region). For example, a cross-sectional view in an upper part of FIG. 4(b) depicts the state in which ⅔ of the gate capacitance of the amplifying transistor AMP contributes to capacitance.

As has been described above, in the solid imaging device of Non-Patent Document 1, at the time of the boosting operation, the amplifying transistor operates in the inter-pentapolar region. As a result, only "⅔" of the gate capacitance of the amplifying transistor can contribute to the boosting operation. This is disadvantageous with respect to the increase in amount of electrons that can be stored in the floating diffusion. This disadvantage is conspicuous in the case where the area occupied by the gate electrode of the amplifying transistor becomes smaller in accordance with the reduction in size of the unit pixel.

In the solid imaging device according to the present embodiment, however, during the reset time (time instant t1 to time instant t2), the potential of the vertical signal line VSL is kept at the voltage of the power supply BIAS which is lower than the voltage Vsig. During the period between time instant t4 and time instant t5, the amplifying transistor is driven such that the drain potential thereof becomes lower than the channel potential. Thus, the amplifier transistor Tr1 can be operated in the inter-tripolar region (linear region) D1, and the entire capacitance value Camp of the gate capacitance (relative to ground) C2 of the amplifier transistor Tr1 can be made to contribute to the boosting operation. Therefore, the potential of the floating diffusion FD can be increased by the potential ΔVfd by the capacitive coupling, with the coefficient "⅔" not being added before Camp. The potential ΔVfd of the increase can be expressed by the following equation:

$$\Delta V_{fd} = \frac{C_{amp}}{C_{amp}+C_{fd}}(Vsig-BIAS)$$

As a result, the amount of electrons that can be stored in the floating diffusion FD can advantageously be increased. In the present embodiment, for example, the amount of electrons that can be stored in the floating diffusion FD can be increased about 1.5 times, compared to the increase in potential ΔVfd' in the prior art indicated by the broken line 35.

(2) The reliability of the boosting operation can be enhanced.

The boosting operation is a static operation, which makes use of the capacitance value Camp of the gate capacitance (relative to ground) C2 of the amplifier transistor Tr1.

Thus, the potential at the floating diffusion FD can be increased, without depending on the frequency at the time when the boosting operation for the unit pixel 21 is executed. Thereby, it is possible to prevent the voltage increase of the floating diffusion FD from varying depending on the frequency. Therefore, the reliability of the boosting operation can advantageously be enhanced.

(3) Microfabrication can advantageously be achieved.

According to the solid imaging device of the above-described present embodiment and the driving method thereof, the entire capacitance value Camp of the gate capacitance (relative to ground) C2 of the amplifier transistor Tr1 can be made to contribute to the boosting operation. There is no need to increase the area of the gate electrode of the amplifier transistor Tr1 in order to increase the gate capacitance, and the area of the gate electrode can be reduced.

As a result, microfabrication can advantageously be achieved in that the area occupied by the amplifying transistor Tr1 can be reduced.

Second Embodiment

Figure 5:
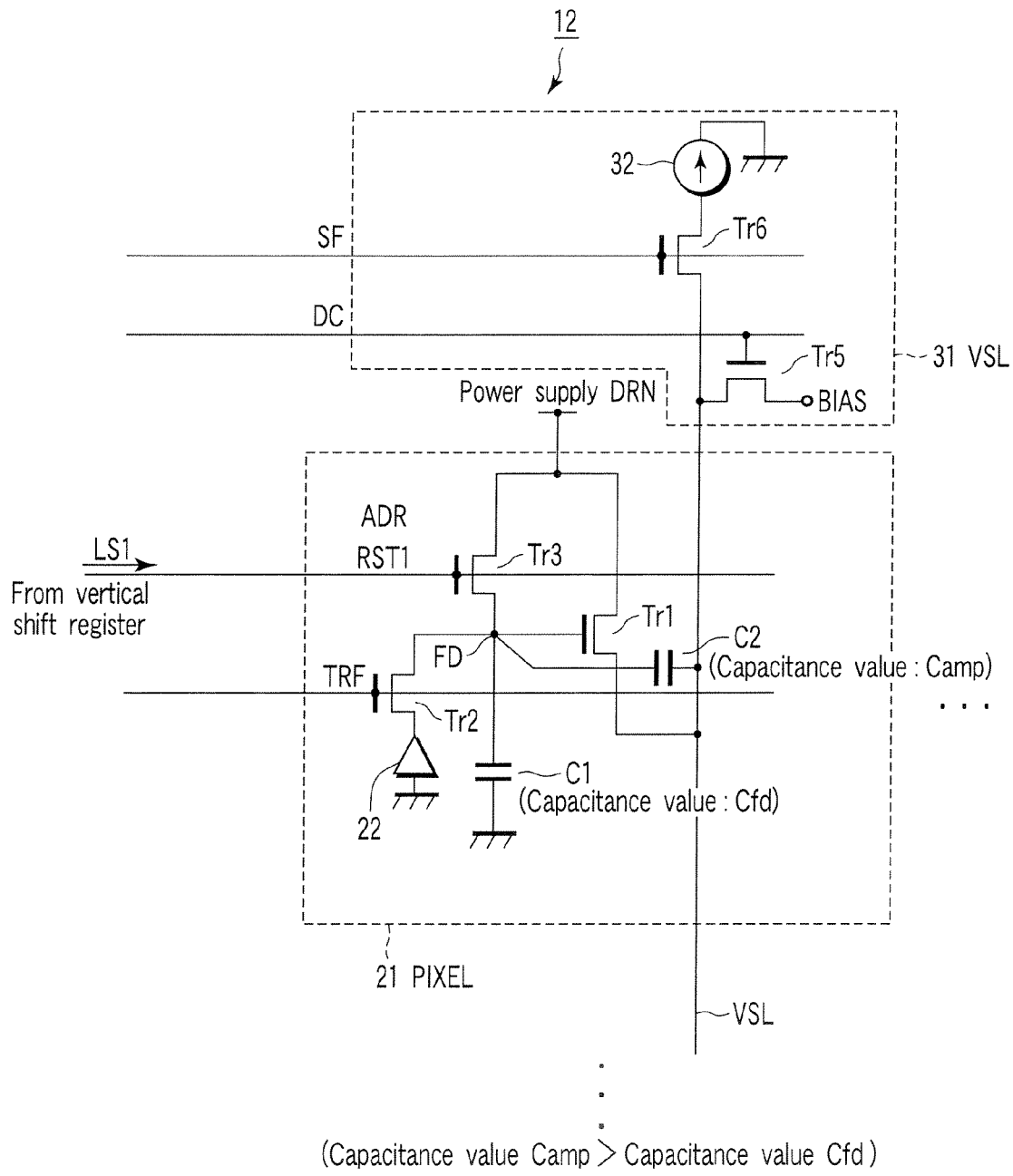
FIG. 5 is a circuit diagram showing one unit pixel according to a second embodiment of the invention.

A solid imaging device according to a second embodiment of the invention is described with reference to FIG. 5 to FIG. 7. FIG. 5 is a plan view that schematically shows an example of the solid imaging device according to this embodiment. A description of the parts common to those in the first embodiment is omitted here.

To begin with, a unit pixel in the pixel region 12 according to this embodiment is described with reference to FIG. 5. In the description below, one selected unit pixel, to which the signal LS1 is input, is taken as an example.

As shown in FIG. 5, the second embodiment differs from the first embodiment in that the unit pixel 21 is a 3Tr CMOS image sensor which includes a photodiode 22, an amplifier transistor Tr1, a read-out transistor Tr2, and a reset transistor Tr3.

The photodiode 22 is configured to photoelectrically convert and store incident light. The amplifier transistor Tr1 is configured to amplify and output a signal from a floating diffusion FD. The amplifier transistor Tr1 has a gate connected to the floating diffusion FD, a source connected to the vertical signal line VSL, and a drain connected to the drain power supply DRN.

The read-out transistor Tr2 is configured to control the storage of the photodiode 22. The read-out transistor Tr2 has a gate connected to the read-out signal line TRF, a source connected to the anode of the photodiode 22, and a drain connected to the floating diffusion FD.

The reset transistor Tr3 is configured to reset the gate potential of the amplifying transistor Tr1. The reset transistor Tr3 has a gate connected to the reset signal line RST1, a source connected to the floating diffusion FD, and a drain connected to the drain power supply DRN.

A capacitance value of a capacitance C1 relative to a ground of the floating diffusion FD is denoted by Cfd, and a capacitance value of a gate capacitance C2 between the floating diffusion FD and the vertical signal line VSL is denoted by Camp.

Further, a VSL control circuit 31, which is configured to control a voltage of the vertical signal line VSL, is provided. The VSL control circuit 31 includes a control signal line DC, a bias transistor Tr5, a selection signal line SF, a load transistor Tr6, and a current source 32.

The bias transistor Tr5 is configured to fix the potential of the vertical signal line VSL. The bias transistor Tr5 has a gate connected to the control signal line DC, a source connected to a power supply BIAS, and a drain connected to the vertical signal line VSL.

The selection signal line SF is connected to the gate of the load transistor Tr6. The drain of the load transistor Tr6 is connected to one end of the current source 32, and the source of the load transistor Tr6 is connected to the vertical signal line VSL. The other end of the current source 32 is grounded.

Next, a cross-sectional device structure of the amplifier transistor Tr1 is described with reference to FIG. 6.

Figure 6:
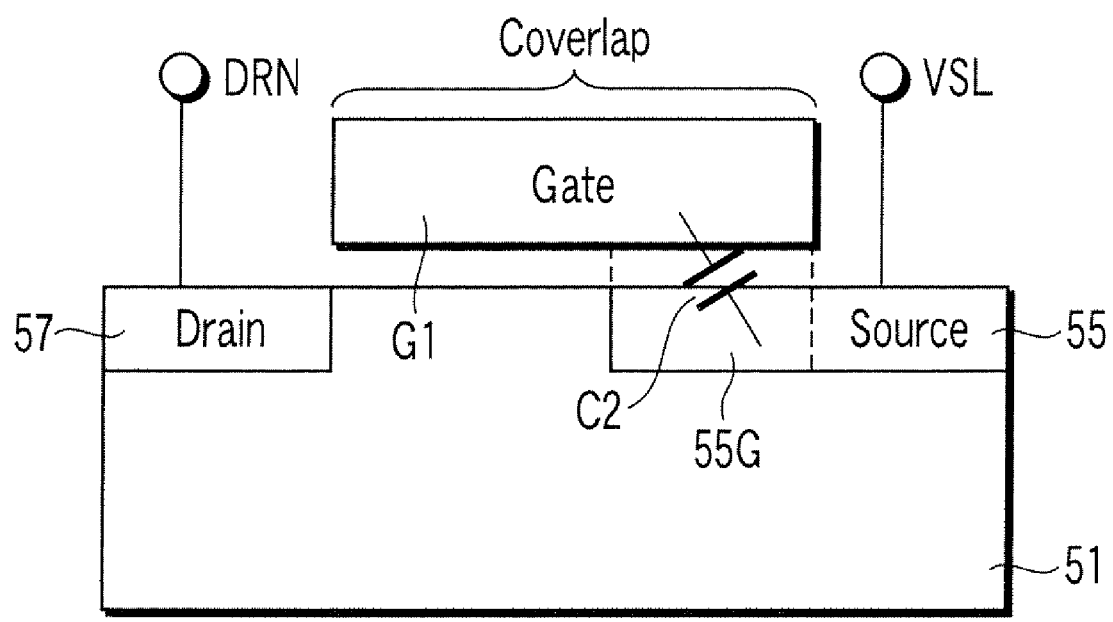
FIG. 6 is a cross-sectional view showing a device structure of an amplifying transistor in FIG. 5.

As is shown in FIG. 6, the amplifying transistor Tr1 has a MOS transistor structure which includes a gate electrode G1 that is provided on a semiconductor substrate 51, and a source 55 and a drain 57 which are provided spaced apart in the substrate 51 so as to sandwich the gate electrode G1. The drain 57 is electrically connected to the power supply DRN, and the source 55 is electrically connected to the vertical signal line VSL.

A partial region 55G of the source 55 is so provided as to lie under the gate electrode G1, and the partial region 55G overlaps the gate electrode G1. The capacity of the overlapping region 55G is defined as C2, and the capacity of the entire of the gate electrode G1 is defined as Coverlap.

<Driving Method>

Next, a driving method of the solid imaging device according to this embodiment is described with reference to FIG. 7. FIG. 7 is a timing chart showing a driving operation of the solid imaging device according to this embodiment. In the description below, one selected unit pixel 21, which is connected to the reset signal line RST1 and to which the signal LS1 is input, is taken as an example.

Figure 7:
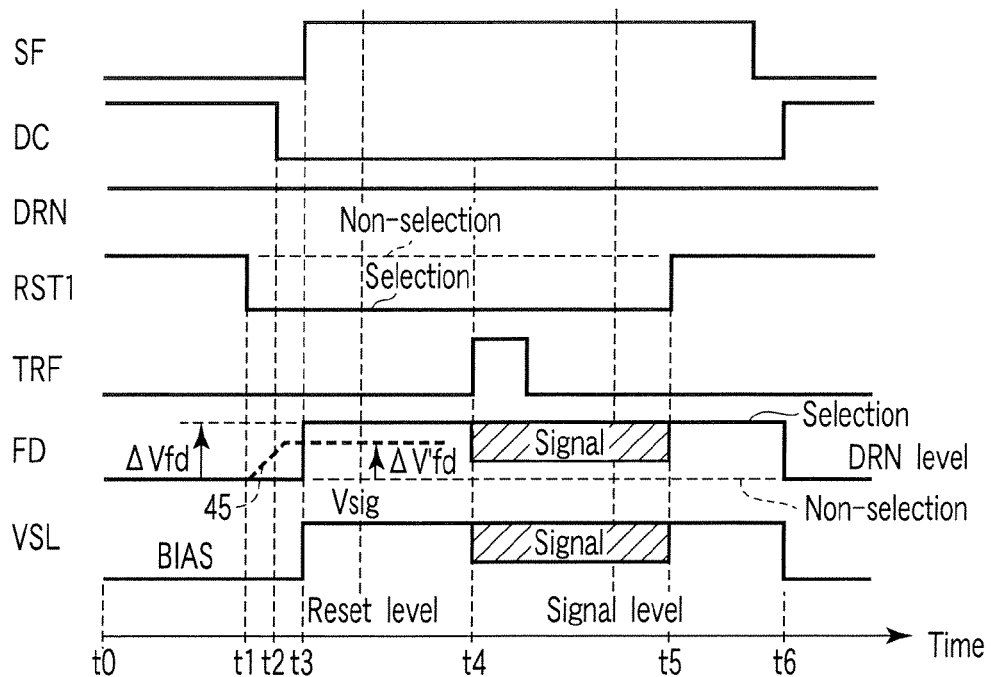
FIG. 7 is a timing chart showing a driving operation of one unit pixel shown in FIG. 5.

As is shown in FIG. 7, in an initial state at time instant t0, the reset signal line RST1 is set at High state, and a current path between the floating diffusion FD and the drain power supply DRN is rendered conductive, and the potential of the floating diffusion FD is fixed. In addition, the control signal line DC is set at High state, the bias transistor Tr5 is turned on, and a relatively low voltage from the power supply BIAS is applied to the vertical signal line VSL.

At time instant t1, the signal LS1 is input to only the reset signal line RST1, which is selected by the vertical shift register 13, and the reset signal line RST1 is set at Low state. The reset transistor Tr3 is turned off, and the floating diffusion FD is set in the floating state.

At time instant t2, the control signal line DC is set at Low state, and the bias transistor Tr5 is turned off.

At time instant t3, the selection signal line SF is set at High state, and the load transistor Tr6 is turned on. The potential of the vertical signal line VSL is set at a voltage Vsig which is determined by a source follower that is constituted by the amplifying transistor Tr1 and load transistor Tr6. At this time, the floating diffusion FD of the selected pixel 21 on the reset signal line RS1 rises by a potential $\Delta Vfd$ due to the capacitive coupling, as expressed below.

$$\Delta V_{fd} = \frac{C_{amp}}{C_{amp} + C_{fd}}(Vsig - \text{BIAS})$$

Case ① $V_{sig} > V_{amp}$ $$\rightarrow \Delta V_{fd} = \frac{C_{amp} - C_{overlap}}{C_{amp} - C_{overlap} + C_{fd}}(V_{sig} - \text{BIAS})$$

Case ② $V_{sig} < V_{amp}$

-continued $$\rightarrow \Delta V_{fd} = \frac{C_{amp}}{C_{amp} + C_{fd}} (V_{sig} - \text{BIAS})$$

where Vamp is the channel potential of the amplifying transistor.

On the other hand, the floating diffusion FD of the pixel on non-selected lines (reset signal line RST2 to reset signal line RSTk) is electrically connected to the drain power supply DRN, and not set in the floating state. Thus, the potential remains substantially constant.

Hence, there is no need to lower the potential of the drain power supply DRN of the selected unit pixel 21, and only the amplifying transistor Tr1 on the selected reset signal line RST1 can be turned on. Specifically, by making use of the capacitive coupling due to the transition of the potential of the vertical signal line from Low state to High state, the potential of the floating diffusion FD can be increased, the amplifying transistor Tr1 can be turned on, and the unit pixel 21 can be selected.

The voltage Vsig that is determined by the potential of the floating diffusion FD of the selected line is output to the vertical signal line VSL.

At time instant t4, if the output of the vertical signal line VSL is set at Reset level of the pixel 21, the read-out signal line TRF is set at High state, and the read-out transistor Tr2 is turned on. The output of the vertical signal line VSL in the state in which a signal of the photodiode 22 is output becomes the output signal level of the unit pixel 21, and an output signal is transmitted (Signal level).

At time instant t5, the reset signal line RST1 is set at High state, the reset transistor Tr3 is turned on, and the current path between the floating diffusion FD and the drain power supply DRN is rendered conductive. Thus, the transmission of the output signal is stopped.

Subsequently, at time instant t6, the control signal line DC is set in High state, the bias transistor Tr5 is turned on, and the operation returns to the initial state.

In the period between time instants t0 and t6, there is no need to lower the voltage value of the drain power supply DRN in order to execute the pixel selection. The voltage value of the drain power supply DRN can always be kept at a high voltage value, and there is no time period in which the voltage value is low. The drain power supply DRN can be maintained at a desired high voltage, for example, by an internal power supply, vertical shift register 13, etc.

In the present embodiment, the potential variation in the floating diffusion FD is determined by the following formula:

$$\frac{C_{amp}}{C_{amp} + C_{fd}} (V_{sig} - \text{BIAS})$$

Hence, it is desirable to set Camp to be higher than Cfd, if possible, to set Camp>Cfd. In addition, for the same reason, it is desirable to set (Vsig−BIAS) at a relatively large value.

According to the structure of the above-described embodiment, the following advantageous effects (4) to (6) can be obtained.

(4) Occurrence of blooming can be prevented.

FIG. 1(*a*) of the above-mentioned Non-Patent Document 1 discloses the structure of the unit pixel. FIG. 1(*b*) discloses the driving pulse of the unit pixel. As shown in these Figures, in order to select the unit pixel, the FD (floating diffusion) potential is normally set at Low state via the reset transistor RST. Only at the time of selection, is the reset transistor RST set at High state, thereby transmitting a reset pulse and turning on the amplifying transistor AMP alone of the selected unit pixel.

By this first reset pulse, the potential of the FD rises to High state, and the drain power supply DRN is set at Low state after read-out. By the second reset pulse, the potential of the FD lowers to Low state and returns to the initial state.

In this driving operation, however, a period in which the drain power supply DRN is lowered to a low value (i.e. a Low-state period) is needed in order to select a desired unit pixel. The drain power supply DRN in the unit pixel also functions to absorb excess signal charge. In the case where there is a period (Low-state period) in which a high voltage is not applied to the drain power supply DRN, if a high-luminance subject is imaged, an excess charge that overflows from the photodiode cannot be absorbed by the drain power supply DRN, leading to occurrence of blooming.

In the present embodiment, however, the floating diffusion FD of the unit pixel 21 to be selected is first set in the floating state (time instant t1). Then, the potential of the vertical signal line VSL is changed from Low state to High state (time instant t3). By making use of the capacitive coupling at this time, the potential of the floating diffusion FD is increased by ΔVfd, and the amplifying transistor Tr1 is turned on (time instant t3). Thereby, the unit pixel 21 can be selected.

Thus, there is no need to lower the voltage value of the drain power supply DRN in order to select the unit pixel 21. Hence, the voltage value of the drain power supply DRN can always be maintained at a high voltage value, and there is no period in which the voltage value is low.

Therefore, even when a high-luminance subject is imaged, the excess charge overflowing from the photodiode 22 can always be absorbed by the drain power supply DRN. As a result, the occurrence of blooming can advantageously be prevented.

(5) Microfabrication can advantageously be achieved.

According to the above-described embodiment, the potential of the vertical signal line VSL is changed from Low state to High state. By making use of the capacitive coupling at this time, the potential of the floating diffusion FD is increased, and the amplifying transistor Tr1 is turned on. Thereby, the unit pixel 21 can be selected.

Thus, the unit pixel 21 can be composed of the amplifying transistor Tr1, read-out transistor Tr2 and reset transistor Tr3 (3Tr type). As a result, the address transistor, for instance, is needless. Compared to the unit pixel (4Tr type) comprising four transistors, the area occupied by the unit pixel 21 can be reduced and therefore microfabrication can advantageously be achieved.

(6) The reliability of the driving operation can be enhanced.

The boosting operation of the floating diffusion FD in the VSL control circuit 31 is a static operation, which makes use of the capacitance value Cfd of the gate capacitance (relative to ground) C1 of the amplifier transistor Tr1.

Thus, the potential of the floating diffusion FD can be increased, without depending on the frequency at the time the boosting operation for the unit pixel 21 is executed. Thereby, it is possible to prevent the voltage increase of the floating diffusion ED from varying depending on the frequency. Therefore, the reliability of the driving operation can advantageously be enhanced.

Third Embodiment

Figure 8:
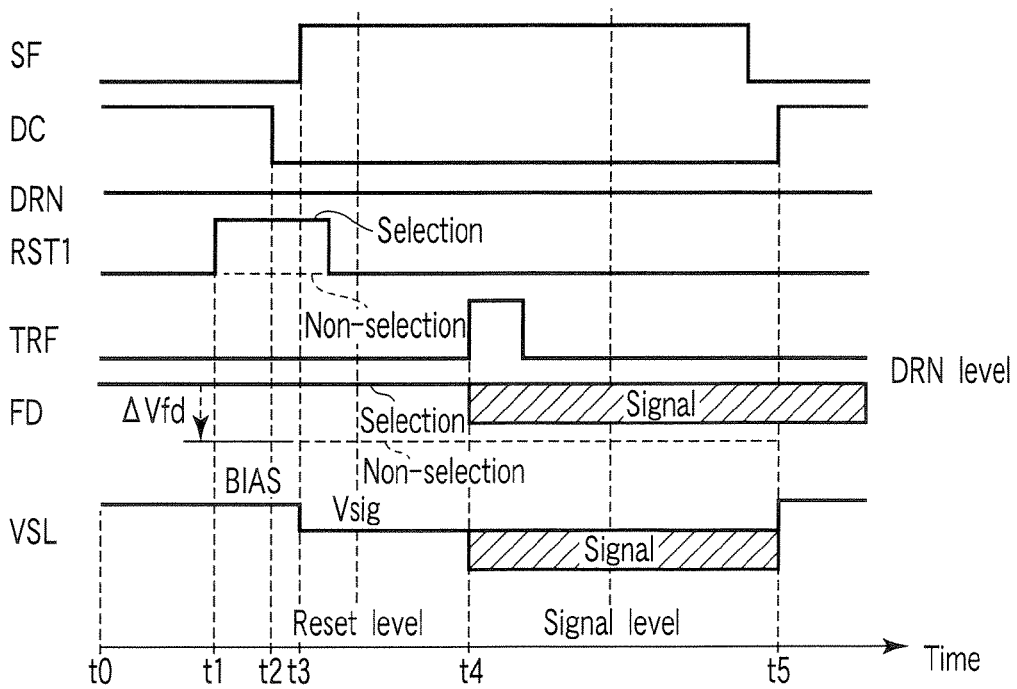
FIG. 8 is a timing chart showing a driving operation of one unit pixel according to a third embodiment of the invention.

A solid imaging device according to a third embodiment of the invention is described with reference to FIG. 8. FIG. 8 is a timing chart showing a driving operation of the solid imaging device according to this embodiment. The third embodiment relates to a driving method in which the relationship in potential between the selected pixel and non-selected pixel in the driving operation described in the second embodiment is reversed. A description of the parts common to those in the second embodiment is omitted here.

The circuit structure in the third embodiment is similar to that in the second embodiment, so a detailed description thereof is omitted. In the description of the driving operation, one selected unit pixel 21, which is selected by the reset signal line RST1, is taken as an example.

<Driving Method>

As is shown in FIG. 8, in an initial state at time instant t0, the signal, LS1 to LSk, is supplied to none of the selected/non-selected reset signal lines, and the gate electrode of the reset transistor Tr3 is at Low state. Thus, the potential of the floating diffusion FD is in the floating state, and the state of the potential in the initial state is reversed. In addition, the control signal line DC is selected, the bias transistor Tr5 is turned on, and a relatively high voltage is applied from the power supply BIAS to the vertical signal line VSL. In these respects, the third embodiment differs from the first embodiment.

At time instant t1, only the reset signal line RST1 of the pixel 21 to be selected is set at High state, and the reset transistor Tr3 is turned on. The current path between the floating diffusion FD and the drain power supply DRN is rendered conductive, and the potential of the floating diffusion FD is fixed.

At time instant t2, the control signal line DC is set at Low state, and the bias transistor Tr5 is turned off.

At time instant t3, the signal selection line SF is set at High state, and the load transistor Tr6 is turned on. The potential of the vertical signal line VSL is set at a voltage Vsig which is determined by a source follower that is constituted by the amplifying transistor Tr1 and load transistor Tr6. At this time, the potential of the floating diffusion FD of the non-selected pixel on the reset signal line lowers by a potential ΔVfd due to the capacitive coupling. The potential ΔVfd is expressed as follows:

$$\Delta V_{fd} = \frac{C_{amp}}{C_{amp} + C_{fd}}(\text{BIAS} - \text{V}sig)$$

Case 1 $V_{sig} > V_{amp}$ $$\rightarrow \Delta V_{fd} = \frac{C_{amp} - C_{overlap}}{C_{amp} - C_{overlap} + C_{fd}}(\text{BIAS} - V_{sig})$$

Case 2 $V_{sig} < V_{amp}$ $$\rightarrow \Delta V_{fd} = \frac{C_{amp}}{C_{amp} + C_{fd}}(\text{BIAS} - V_{sig})$$

where Vamp is the channel potential of the amplifying transistor.

On the other hand, the floating diffusion FD of the selected pixel 21 is not in the floating state, and is electrically connected to the drain power supply DRN and the potential remains substantially constant. In these respects, the third embodiment differs from the first embodiment. Thus, only the amplifying transistor Tr1 of the selected pixel 21 is turned on, and the voltage, which is determined by the potential of the floating diffusion FD to be selected, is output to the vertical signal line VSL.

At time instant t4, if the output of the vertical signal line VSL is set at Reset level of the pixel 21, the read-out signal line TRF is set at High state, and the read-out transistor Tr2 is turned on. The output of the vertical signal line VSL in the state in which a signal of the photodiode 22 is output becomes the output signal level of the unit pixel 21, and an output signal is transmitted (Signal level).

At time instant t5, the control signal line DC is set at High state, the bias transistor Tr5 is turned on, and the operation returns to the initial state.

According to the solid imaging device of this embodiment and the driving method thereof, the above-described advantageous effects (4) to (6) can be obtained.

Further, in this driving operation, at time instant t3, the potential of the floating diffusion FD of the non-selected pixel lowers by the potential ΔVfd due to the capacitive coupling. On the other hand, the floating diffusion FD of the selected pixel 21 is not in the floating state, and is electrically connected to the drain power supply DRN and the potential remains substantially constant. Thus, only the amplifying transistor of the selected pixel 21 can be turned on.

Hence, there is no need to lower the voltage value of the drain power supply DRN in order to select the unit pixel 21. Therefore, the voltage value of the drain power supply DRN can always be kept at a high voltage value, the desired pixel 21 can be selected, and the occurrence of blooming can advantageously be prevented.

As described above, the relationship in potential between the selected pixel 21 and non-selected pixel can be reversed, as needed, relative to the relationship in the second embodiment, and the pixel selection can be executed.

The solid imaging devices of the second and third embodiments are more effective in the case where the conductivity type of the impurity diffusion layer, of which the photodiode 22 is formed, is the same as the conductivity type of the semiconductor substrate.

A more specific description is given. For example, in the case where the photodiode 22 is formed of an n-type impurity diffusion layer and the unit pixel 21 (CMOS sensor) is formed by using an n-type semiconductor substrate, excess charge can be absorbed by the n-type semiconductor substrate as well as by the drain power supply DRN. Thus, advantageously, the occurrence of blooming can be prevented more effectively.

On the other hand, in the case where the photodiode 22 is formed of an n-type impurity diffusion layer and the unit pixel 21 (CMOS sensor) is formed by using a p-type semiconductor substrate, excess charge can be absorbed only by the drain power supply DRN and cannot be absorbed by the p-type semiconductor substrate.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A solid imaging device comprising:
   a vertical signal line;
   a unit pixel including a photodiode which photoelectrically converts and stores incident light, an amplifying transistor which amplifies an input signal from the photodiode and outputs the amplified signal to the vertical signal line, a reset transistor which resets a potential of a control electrode of the amplifying transistor, and a read-out transistor which controls storage of the photodiode; and a control circuit including a bias transistor configured to maintain a first potential of the vertical signal line unchanged, by continuing to supply a bias potential at least lower than a signal level to the vertical signal line by turning on a bias translator, while the reset transistor is turned on;

a current source configured to be electronically connected to the vertical signal line when the read-out transistor is on; and a load transistor having a current path, a first end of which is connected to one end of a current path of the bias transistor and a second end of which is connected to an input of the current source, wherein a second potential of the vertical signal line, after the reset transistor is turned off and before the read-out transistor is turned on, is higher than the first potential.

2. The solid imaging device according to claim 1, wherein a relationship, Camp>Cfd, is established, where Cfd is a capacitance value of a capacitance, relative to a ground, of the control electrode of the amplifying transistor, and Camp is a capacitance value between the amplifying transistor and the vertical signal line.

3. The solid imaging device according to claim 1, wherein a drain voltage of the amplifying transistor is lower than a channel potential of the amplifying transistor during a period in which the reset transistor is turned on.

4. The solid imaging device according to claim 1, wherein the control circuit includes a control signal line, and the bias transistor having a control electrode connected to the control signal line, one end of a current path of the bias transistor being connected to the vertical signal line, the bias potential being applied to the other end of the current path of the bias transistor.

5. The solid imaging device according to claim 1, wherein the current source is connected to a power supply.

6. The solid imaging device according to claim 1, further comprising a drain power supply which is connected to one end of a current path of the amplifying transistor and to one end of a current path of the reset transistor.

7. The solid imaging device according to claim 6, wherein the unit pixel further includes an address transistor having a current path, one end of which is connected to one end of a current path of the amplifying transistor and the other end of which is connected to the drain power supply.

8. The solid imaging device according to claim 1, wherein a potential of a floating diffusion connected to a gate electrode of the amplifying transistor is increased while the reset transistor is on.

9. The solid imaging device according to claim 1, wherein the amplifying transistor includes a gate electrode provided on a semiconductor substrate, and a source and a drain provided spaced apart in the semiconductor substrate such that the source and the drain sandwich the gate electrode, the source including a partial region lying under the gate electrode, and capacitive-coupling is provided between the partial region of the source and the gate electrode.

10. A driving method of a solid imaging device comprising a vertical signal line; a plurality of unit pixels, each unit pixel including a photodiode which photoelectrically converts and stores incident light, an amplifying transistor which amplifies an input signal from the photodiode and outputs the amplified signal to the vertical signal line, a reset transistor which resets a potential of a control electrode of the amplifying transistor, and a read-out transistor which controls storage of the photodiode; a drain power supply which is connected to one end of a current path of the amplifying transistor and to one end of a current path of the reset transistor and has a fixed voltage value; and a control circuit configured to control a potential of the vertical signal line, wherein the state of the potential of the vertical signal line maintains a first potential at least lower than a signal level while the reset transistor is turned on, a second potential of the vertical signal line, after the reset transistor is turned off and before the read-out transistor is turned on, is higher than the first potential, and the amplifying transistor is turned on by making use of a gate capacitance of the amplifying transistor, thereby selecting the unit pixel, and causing a current source to be electrically connected to the vertical signal line when the read-out transistor is on.

11. The method according to claim 10, wherein a potential of a floating diffusion connected to a gate electrode of the amplifying transistor is increased while the reset transistor is on.

12. The method according to claim 10, wherein the amplifying transistor includes a gate electrode provided on a semiconductor substrate, and a source and a drain provided spaced apart in the semiconductor substrate such that the source and the drain sandwich the gate electrode, the source including a partial region lying under the gate electrode, and capacitive-coupling is provided between the partial region of the source and the gate electrode.

* * * * *